United States Patent
Choi et al.

(10) Patent No.: US 11,011,749 B2
(45) Date of Patent: May 18, 2021

(54) PREPARATION METHOD OF LITHIUM-TITANIUM COMPLEX OXIDE ACCORDING TO PARTICLE SIZE CONTROL OF SLURRY THROUGH WET-MILLING

(71) Applicant: POSCO CHEMICAL CO., LTD., Pohang-si (KR)

(72) Inventors: Su Bong Choi, Gumi-si (KR); Chun Gu Kang, Seoul (KR); Jeong Eun Choi, Chungcheongbuk-do (KR); Seung Chang Jeong, Andong-si (KR); Jae An Lee, Gumi-si (KR); Jeong Han Kim, Gumi-si (KR)

(73) Assignee: POSCO CHEMICAL CO., LTD, Pohang-si (KR)

( * ) Notice: Subject to any disclaimer, the term of this patent is extended or adjusted under 35 U.S.C. 154(b) by 0 days.

(21) Appl. No.: 16/489,639

(22) PCT Filed: May 26, 2017

(86) PCT No.: PCT/KR2017/005536
§ 371 (c)(1),
(2) Date: Aug. 28, 2019

(87) PCT Pub. No.: WO2018/093000
PCT Pub. Date: May 24, 2018

(65) Prior Publication Data
US 2020/0144614 A1    May 7, 2020

(30) Foreign Application Priority Data
Nov. 17, 2016 (KR) .......................... 10-2016-0153511

(51) Int. Cl.
H01M 4/485        (2010.01)
C01G 25/00        (2006.01)
H01M 4/02         (2006.01)

(52) U.S. Cl.
CPC .......... *H01M 4/485* (2013.01); *C01G 25/006* (2013.01); *C01P 2004/03* (2013.01);
(Continued)

(58) Field of Classification Search
CPC ............ H01M 4/485; H01M 2004/021; C01G 25/006; C01G 23/626; C01P 2004/03;
(Continued)

(56) References Cited

U.S. PATENT DOCUMENTS

2014/0322609 A1* 10/2014 Choi .................... H01M 4/485
                                                    429/231.1

FOREIGN PATENT DOCUMENTS

KR    10-2011-0114392 A    10/2011
KR    10-2013-0091540 A    8/2013
(Continued)

OTHER PUBLICATIONS

International Search Report and Written Opinion in International Application No. PCT/KR2017/005536, filed May 26, 2017.
(Continued)

*Primary Examiner* — Andrew J. Oyer
(74) *Attorney, Agent, or Firm* — Saliwanchik, Lloyd & Eisenschenk

(57) ABSTRACT

The present invention relates to a lithium-titanium complex oxide used in an electrode active material. A preparation method of a lithium-titanium complex oxide according to the present invention comprises the steps of: preparing a slurry mixture in which a titanium oxide, lithium and zirconium are mixed; wet-milling the mixture using beads having a size of 0.30 mm or less to obtain a wet-milled
(Continued)

mixture; spray drying the wet-milled mixture to obtain a spray dried mixture; and calcining the spray dried mixture.

11 Claims, 21 Drawing Sheets

(52) U.S. Cl.
CPC ...... *C01P 2004/61* (2013.01); *C01P 2004/62* (2013.01); *C01P 2006/40* (2013.01); *H01M 2004/021* (2013.01)

(58) Field of Classification Search
CPC .............. C01P 2004/61; C01P 2004/62; C01P 2006/40; C01P 2004/51; C01P 2006/80; C01P 2002/54; C01P 2006/12; C01P 2006/11; C04B 35/626; C04B 35/64; C04B 35/62615; C04B 35/62625; C04B 35/62655
See application file for complete search history.

(56) References Cited

FOREIGN PATENT DOCUMENTS

| KR | 10-2013-0121422 A | 11/2013 |
| KR | 10-1569782 B1 | 11/2015 |
| KR | 10-1630198 B1 | 6/2016 |

OTHER PUBLICATIONS

Ohzuku, T. et al., "Zero-Strain Insertion Material of $Li[Li_{1/3}Ti_{5/3}]O_4$ for Rechargeable Lithium Cells," *J. Electrochem. Soc.*, May 1995, 142(5):1431-1435, The Electrochemical Society, Inc.

Zachau-Christiansen, B. et al., "Lithium Insertion in Oxide Spinels," *Solid State Ionics*, 1990, 40/41:580-584, Elsevier Science Publishers B.V.

* cited by examiner

PREPARATION METHOD OF LITHIUM-TITANIUM COMPLEX OXIDE ACCORDING TO PARTICLE SIZE CONTROL OF SLURRY THROUGH WET-MILLING

CROSS-REFERENCE TO RELATED APPLICATIONS

This application is the U.S. national stage application of International Patent Application No. PCT/KR2017/005536, filed May 26, 2017, which claims the benefit under 35 U.S.C. § 119 of Korean Application No. 10-2016-0153511, filed Nov. 17, 2016, the disclosures of each of which are incorporated herein by reference in their entirety.

BACKGROUND OF THE INVENTION

Field of the Invention

The present invention relates to a lithium-titanium complex oxide used in an electrode active material and, more specifically, to a preparation method of a lithium-titanium complex oxide having improved specific surface area and electrical characteristics through particle size control.

Related Art

Research and development is actively making progress on, as a high energy density battery, a non-aqueous electrolyte battery in which charging and discharging are performed by moving lithium ions to an anode and a cathode. Recently, a lithium-titanium complex oxide having a high lithium intercalation or deintercalation electric potential has been receiving attention. The lithium-titanium complex oxide has an advantage that metal charging or low temperature performance is excellent since a metal lithium is not precipitated in principle in the lithium intercalation or deintercalation electric potential.

The lithium-titanium complex oxide includes a spinel-type lithium titanate represented by general formula $Li_{(1+x)}Ti_{(2-x)}O_y$ (x=−0.2 to 1.0, y=3 to 4), and typical examples of the lithium-titanium complex oxide include $Li_{4/3}Ti_{5/3}O_4$, $LiTi_2O_4$, and $Li_2TiO_3$. Since these materials have conventionally been used as a cathode active material, and can be also used as an anode active material, the future of these materials as the cathode and anode active materials of batteries is expected. These materials have a voltage of 1.5 V on the basis of lithium, and a long lifetime. Further, since expansion and contraction of these materials can be disregarded during charging and discharging, the these materials are an electrode material which receives attention when the batteries are manufactured in a large size. Particularly, since the spinel-type lithium titanate (composition formula $Li_{4+x}Ti_5O_{12}$ (0≤x≤3)) has a small volume change during charging and discharging and is reversibly excellent, the spinel-type lithium titanate has been receiving attention.

In a spinel-type lithium titanate structure of $Li_4Ti_5O_{12}$, a formal valence of titanium is +4 which is the highest oxidized state that can be obtained with respect to titanium (B. Zachau-Christiansen, et al., Solid State Ionics, Volumes 40-41, part 2, pages 580-584 (1990)).

Theoretically, a lithium intercalation reaction (intercalation) in the anode is as follows.

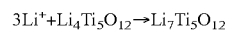

$3Li^+ + Li_4Ti_5O_{12} \rightarrow Li_7Ti_5O_{12}$

This reaction occurs at about 1.5 V with respect to metal lithium. The formal valence of titanium is reduced from a +4 state to a +3 state, and when lithium is completely intercalated, the formal valence of titanium becomes an average oxidized state of 3.4 (60% of $Ti^{3+}$ and 40% of $Ti^{4+}$).

It has been found out that the $Li_4Ti_5O_{12}$ material can intercalate lithium ions without performing a pressurizing or contracting process with respect to a lattice (Ohzuku T, et al, Journal of the Electrochemical Society, 142(5), pages 1431-1435 (1995)) which becomes ideal with respect to a hybrid electric vehicle (HEV) applications.

However, since a theoretical capacity of the spinel-type lithium titanate is 175 mAh/g, there has been a limit to high capacity spinel-type lithium titanate. Further, the spinel-type lithium titanate has had problems that, although the spinel-type lithium titanate has electrochemical activities in the production process since the spinel-type lithium titanate is partially formed in a rock salt structure of rutile type $TiO_2$(r-$TiO_2$), an effective capacity of lithium titanate obtained is decreased since the spinel-type lithium titanate has a low reaction rate, an inclined potential curve, and a small capacity.

Further, the lithium-titanium complex oxide has disadvantages of a small capacity per unit weight and a low energy density.

In order to solve these problems, it is required to develop an active material which has a low internal resistance and a high electrical conductivity and is excellent in output characteristics while complementing the disadvantages of the lithium-titanium complex oxide.

SUMMARY OF THE INVENTION

The purpose of the present invention is to provide a lithium-titanium complex oxide having improved specific surface area and electrochemical characteristics by controlling particle sizes of a precursor slurry using wet-milling.

In order to achieve the purpose, an aspect of the present invention is to provide a preparation method of a lithium-titanium complex oxide, the preparation method comprising the steps of: preparing a slurry mixture in which a titanium oxide, lithium and zirconium are mixed; wet-milling the mixture using beads having a size of 0.10 to 0.30 mm to obtain a wet-milled mixture; spray drying the wet-milled mixture to obtain a spray dried mixture; and calcining the spray dried mixture.

The wet-milling step may comprise performing a wet-milling process for 2 to 7 hours, and the wet-milling process may be performed at a milling speed of 4,200 rpm.

The wet-milling step may comprise wet-milling particles of the slurry mixture to a particle size $D_{50}$ of 0.1 μm.

Lithium and titanium contained in the slurry mixture may have a Li/Ti ratio of 0.81, and an amount of Zr atom contained in the slurry mixture may be 0.01 to 0.10 mol %.

The spray dried mixture may have a particle size $D_{50}$ of 7 to 20 μm.

The calcination step may comprise calcining the mixture to a temperature of 700 to 800° C. in the inert gas atmosphere for 10 to 20 hours.

The preparation method of the present invention may further comprise the step of classifying the calcined mixture using a sieve having a sieve size corresponding to 200 to 400 meshes or the step of finely milling the calcined mixture to obtain a finely milled mixture.

The finely milled mixture may have a particle size $D_{50}$ of 0.5 to 2.0 μm.

A lithium-titanium complex oxide may be prepared by the above process, in which Rutile-TiO$_2$ may be contained in an amount of about 1.2 to 1.6%, and Anatase-TiO$_2$ may be contained in an amount of 0%.

DESCRIPTION OF EXEMPLARY EMBODIMENTS

Figure 1A:
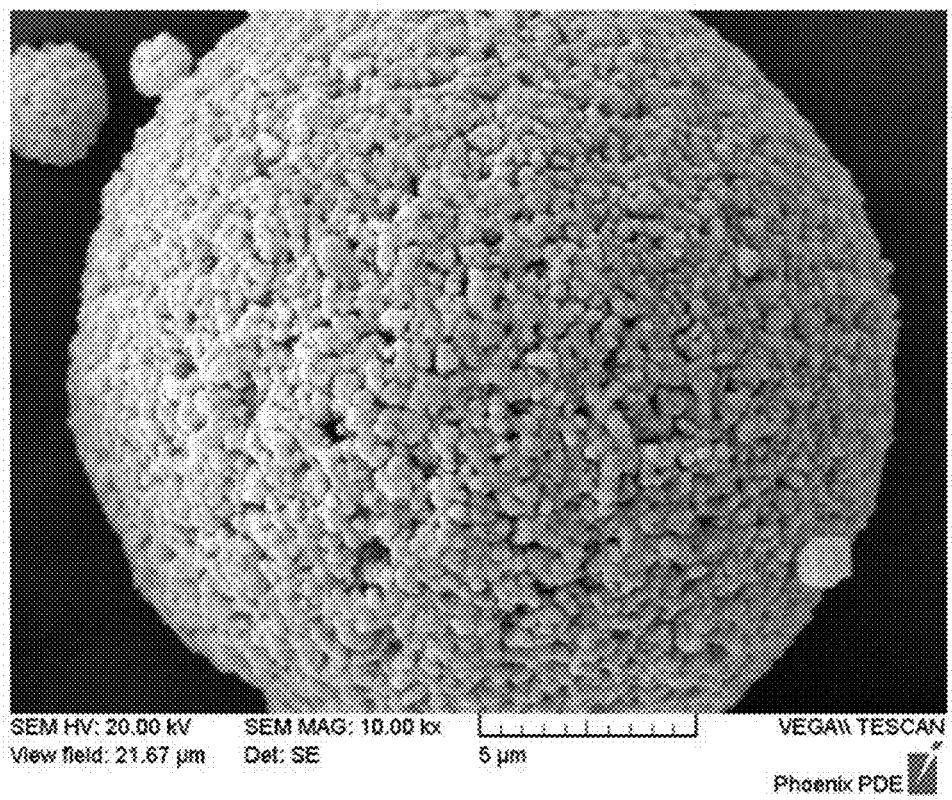
FIGS. 1A to 1E illustrate Scanning Electron Microscope (SEM) images having primary particle shapes of precursors according to particle sizes of wet-milled slurries of the present invention.
Figure 1B:
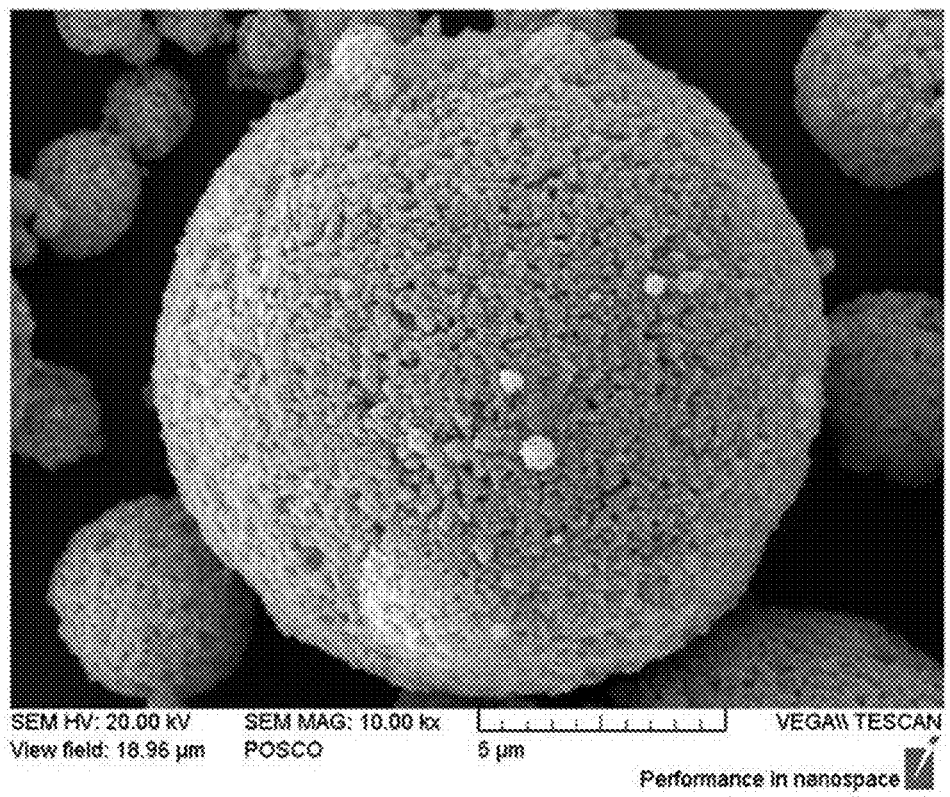
Figure 1C:
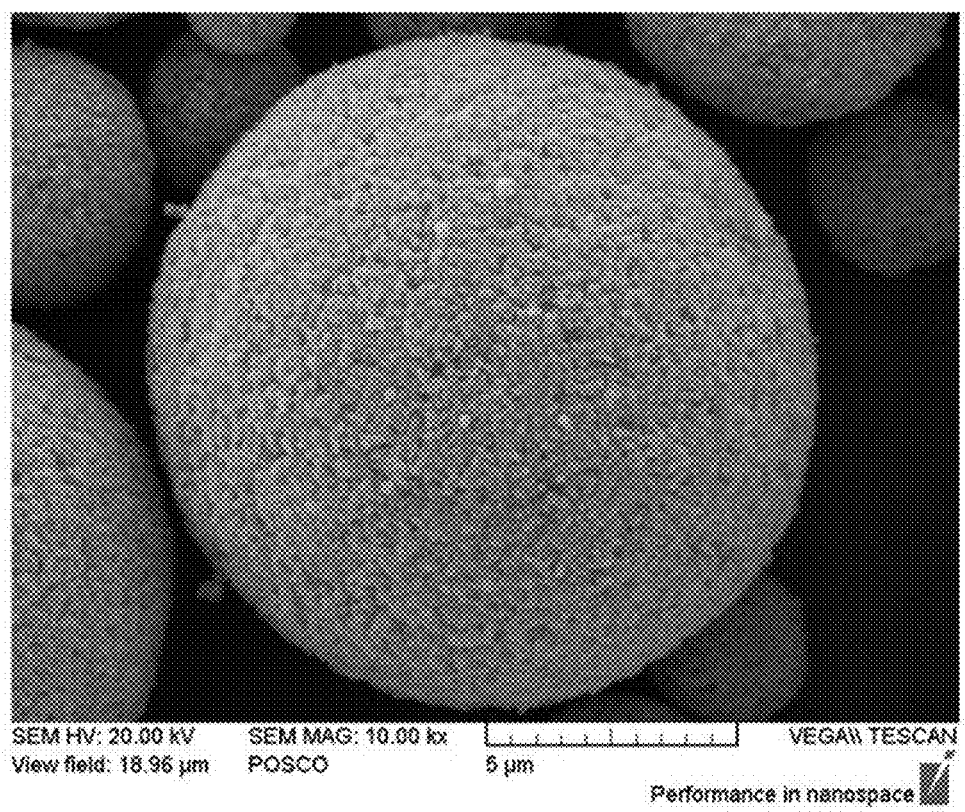
Figure 1D:
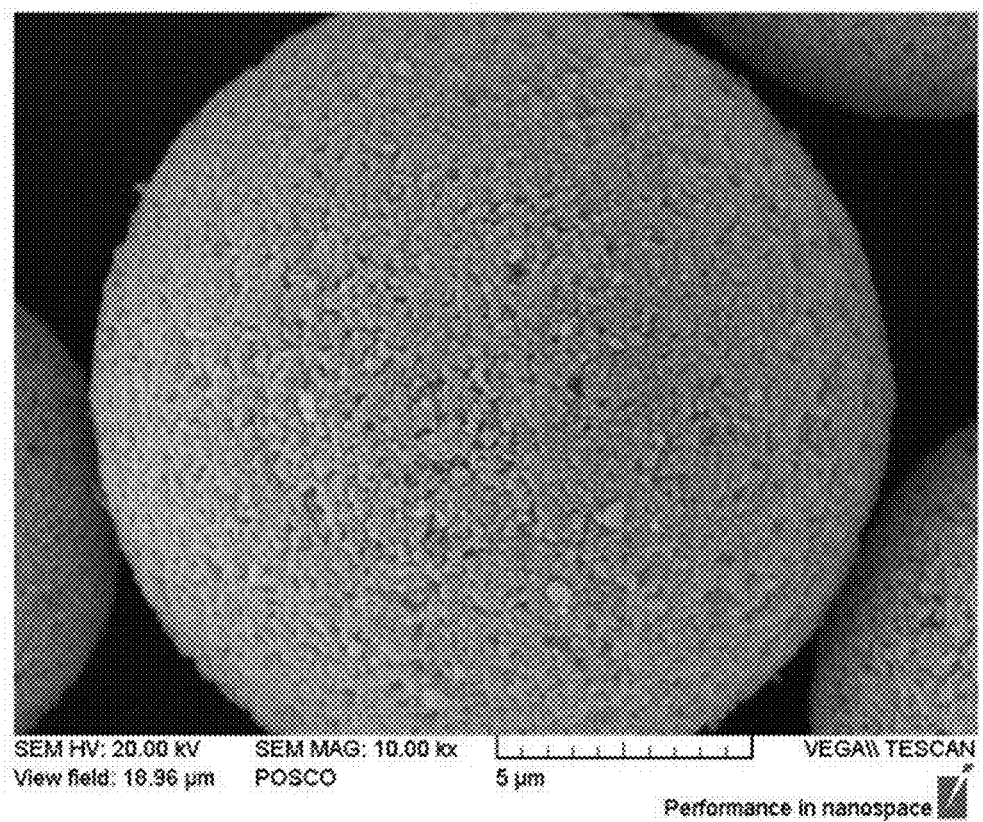
Figure 1E:
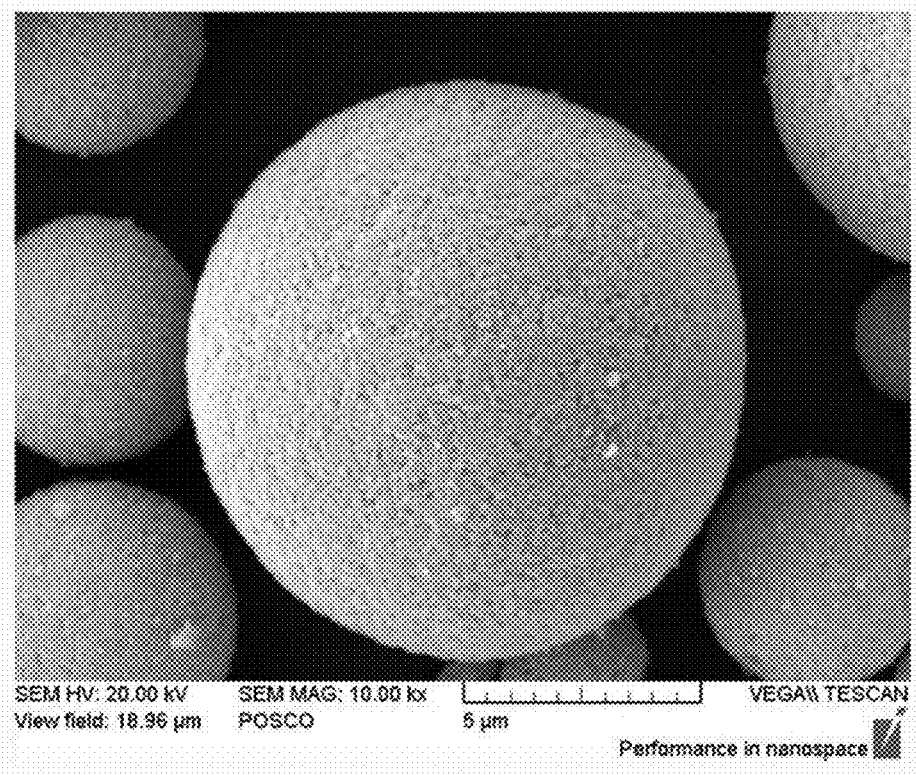
Figure 2A:
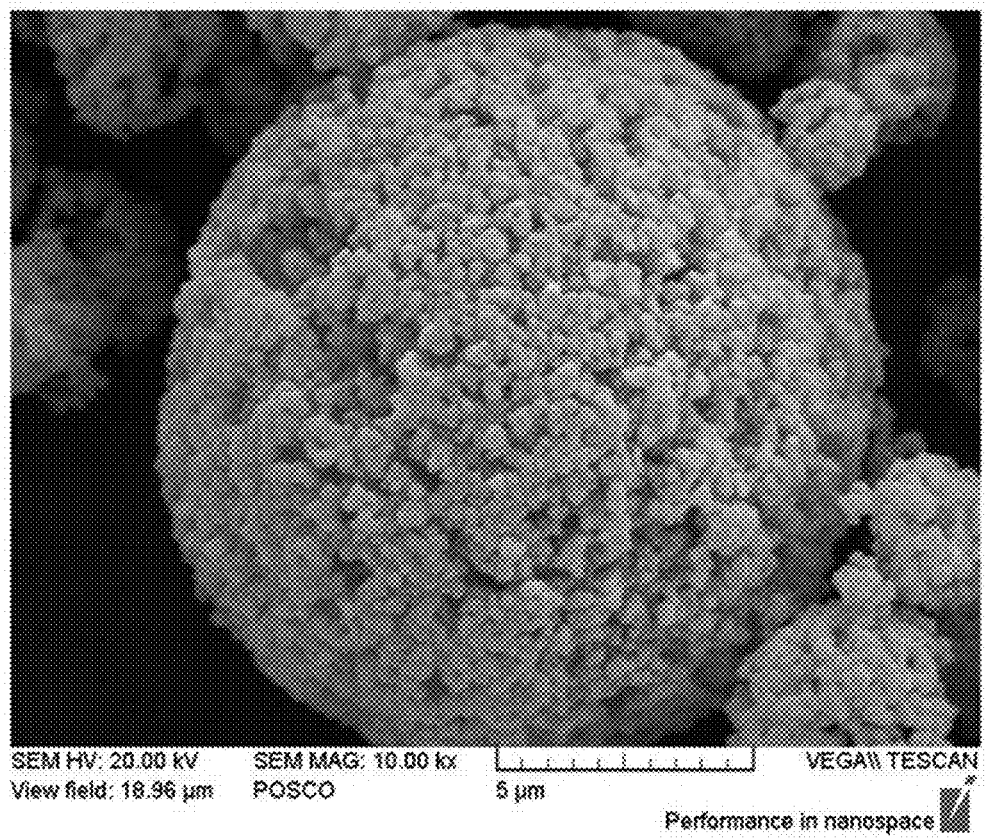
FIGS. 2A to 2E illustrate SEM images having primary particle shapes of calcined products of the present invention.
Figure 2B:
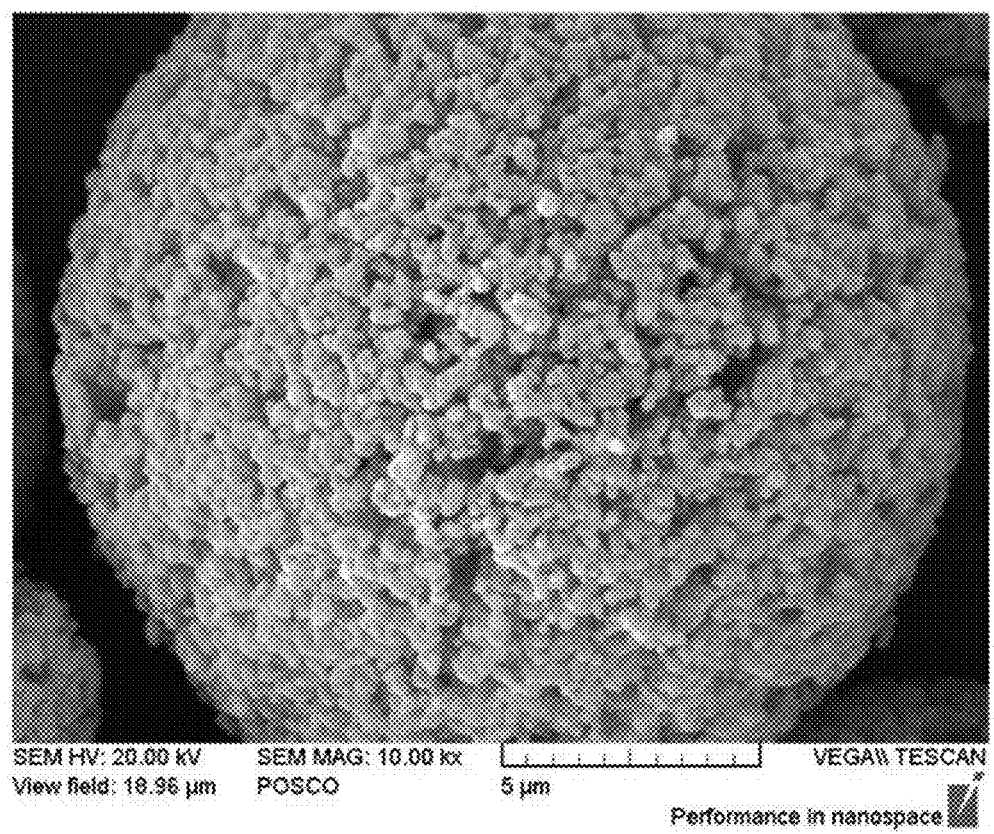
Figure 2C:
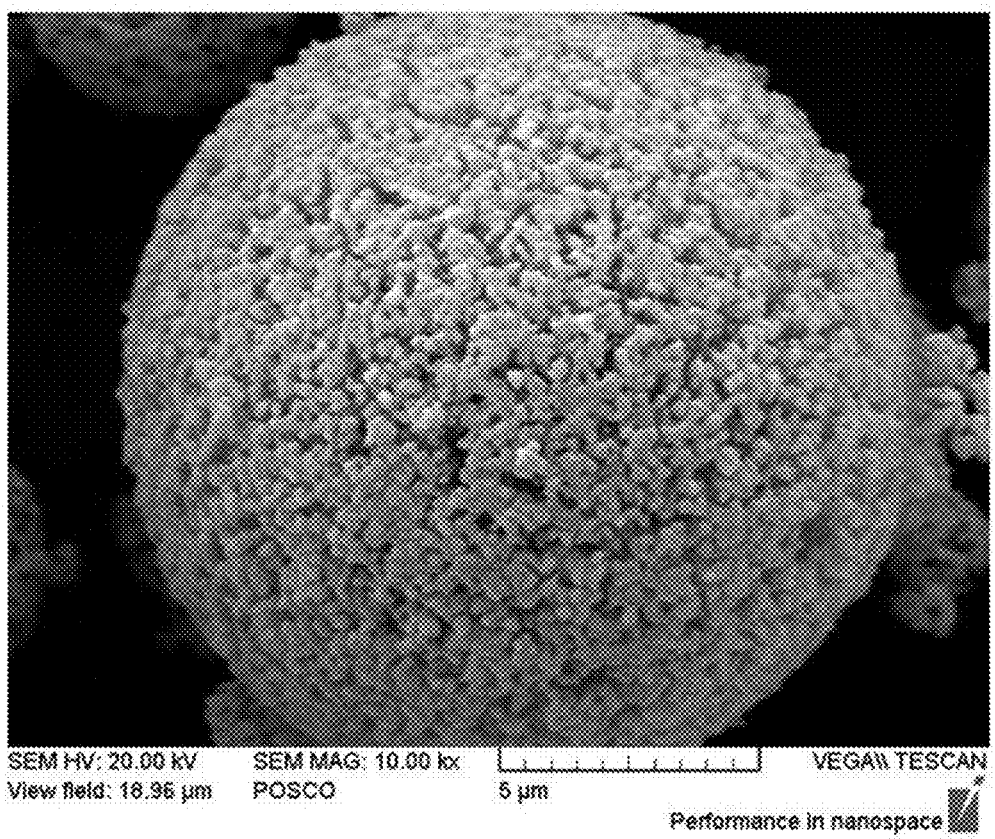
Figure 2D:
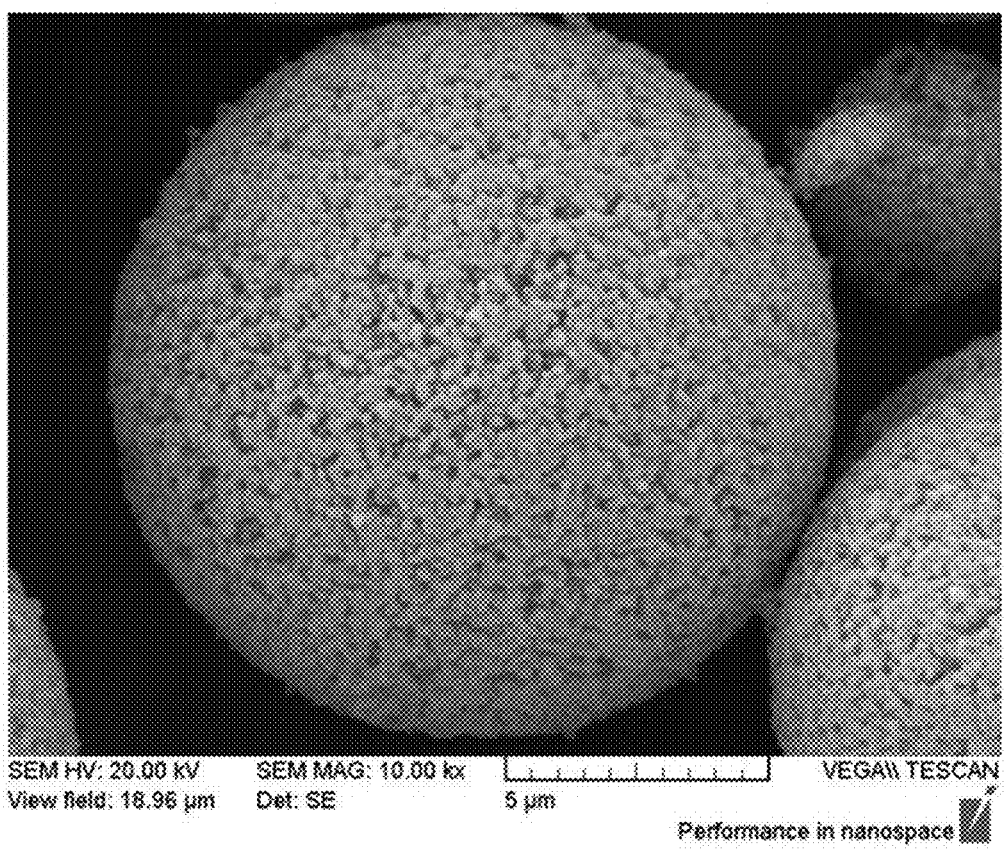
Figure 2E:
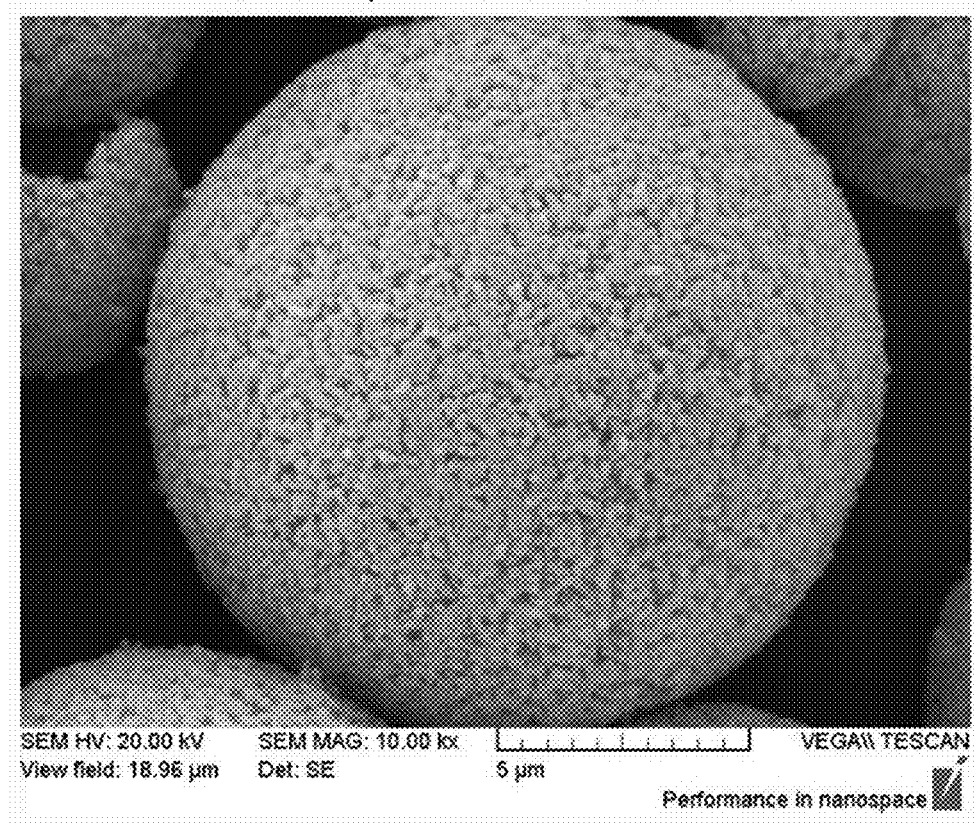
Figure 3A:
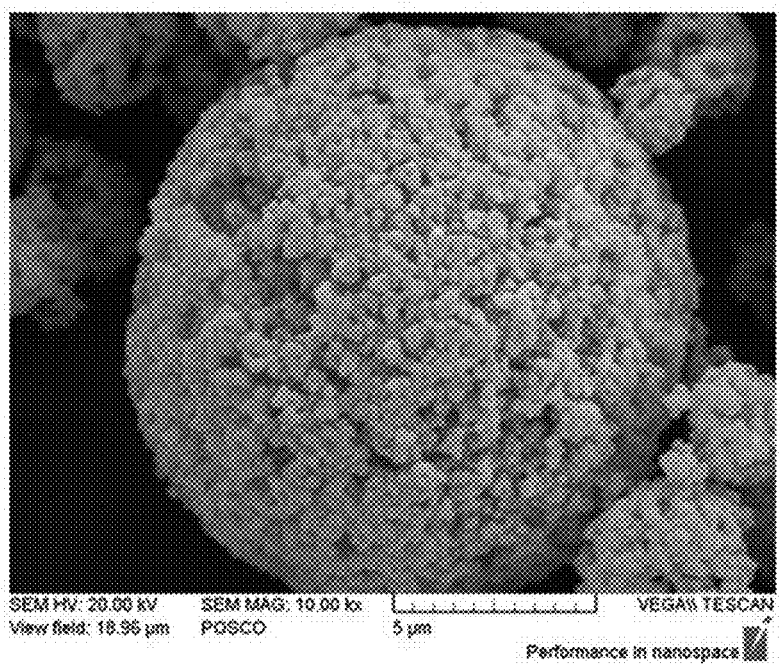
FIGS. 3A to 3D illustrate SEM images having primary particle cross-sectional shapes of the calcined products of the present invention.
Figure 3B:
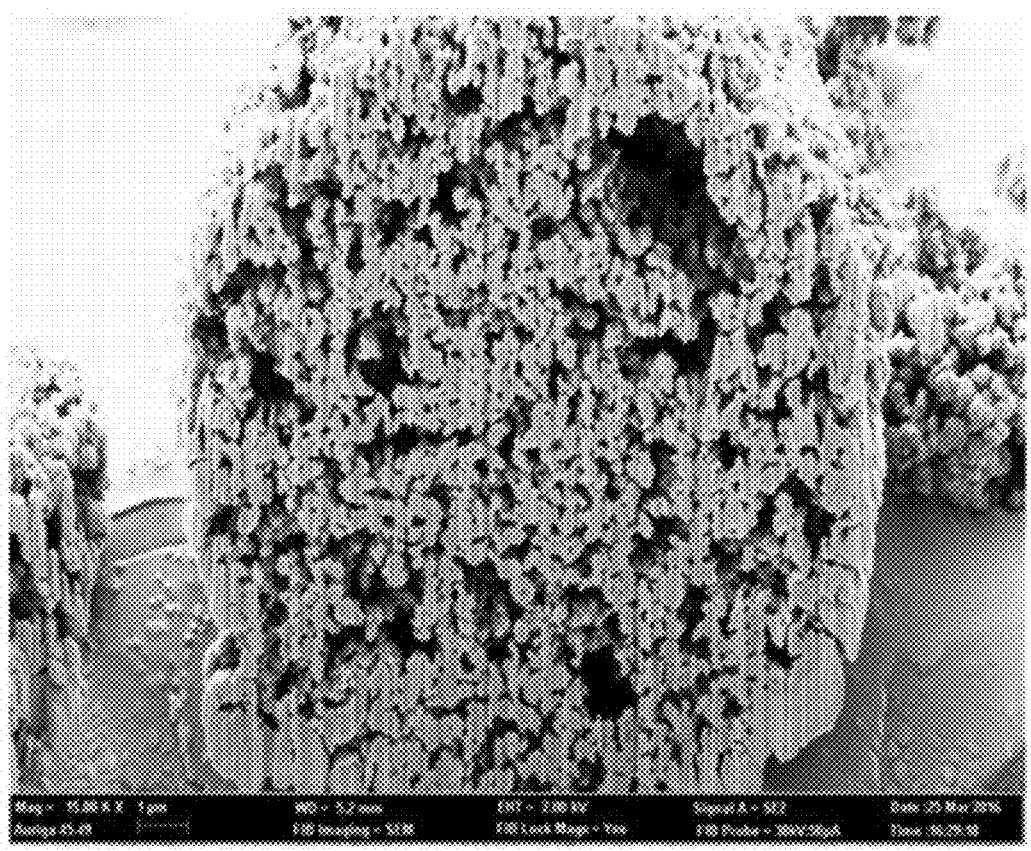
Figure 3C:
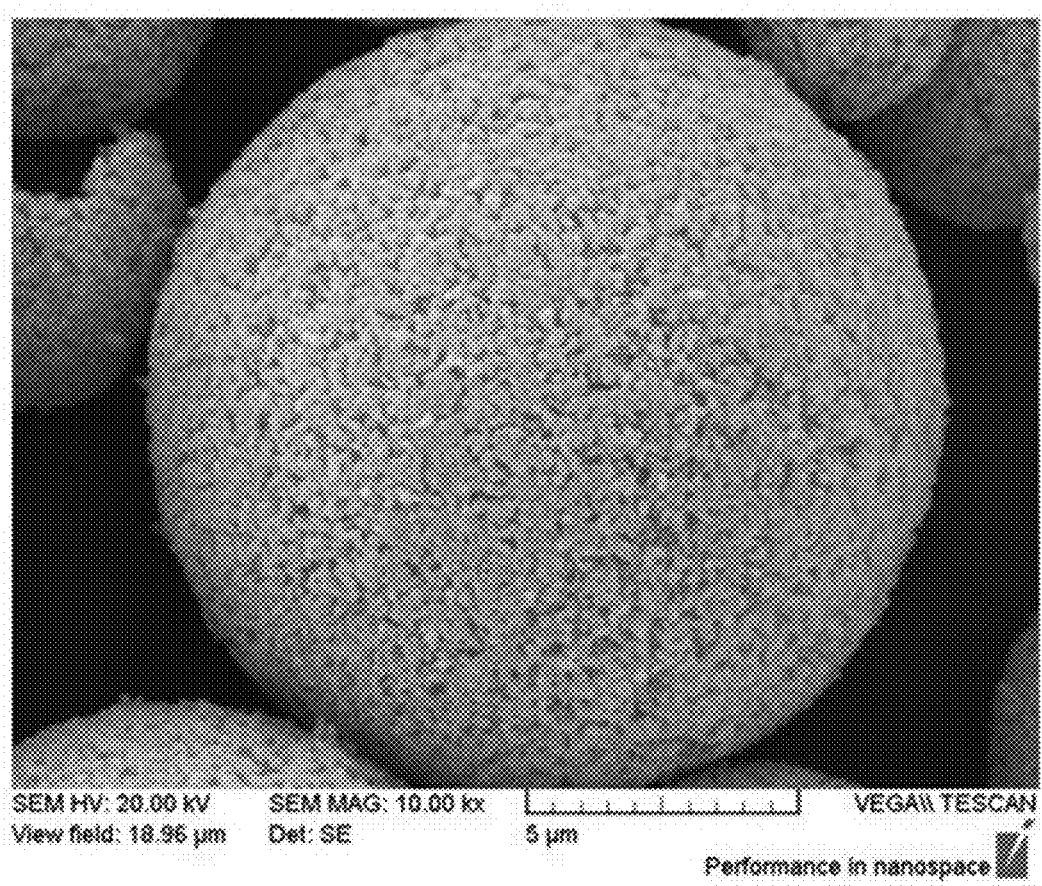
Figure 3D:
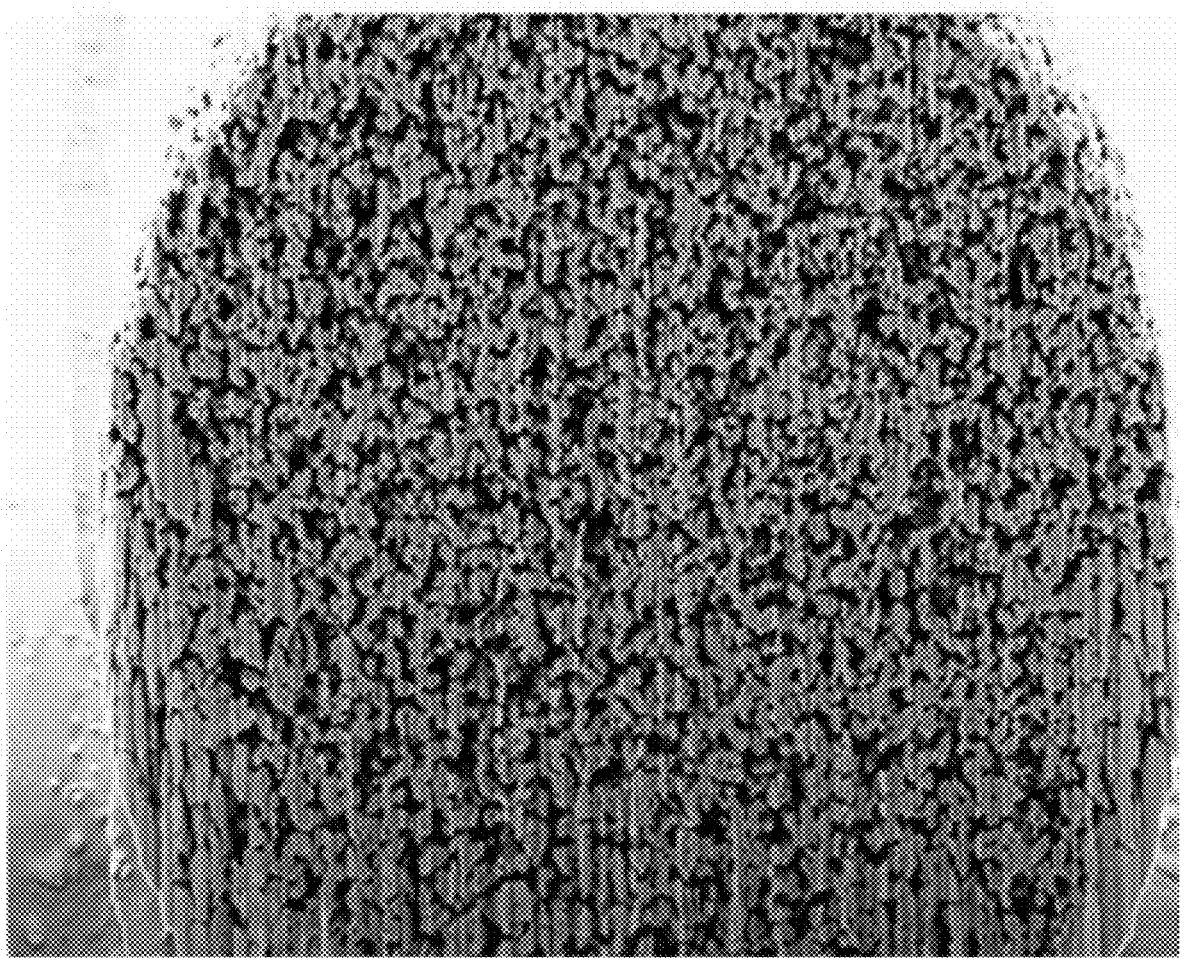

Hereinafter, the present invention is described in detail.

A preparation method of a lithium-titanium complex oxide according to an embodiment of the present invention comprises the steps of: preparing a slurry mixture in which a titanium oxide, lithium and zirconium are mixed; wet-milling the mixture using beads having a size of 0.30 mm or less to obtain a wet-milled mixture; spray drying the wet-milled mixture to obtain a spray dried mixture; and calcining the spray dried mixture.

The wet-milling is preferably performed by using a method of performing a wet-milling process using a medium stirring type milling pillar after dispersing the slurry mixture in a dispersion medium. The dispersion medium used for wet-milling of the slurry mixture may include various organic solvents or aqueous solvents, and may preferably include water.

The wet-milling step may comprise performing a wet-milling process for 2 to 7 hours, the wet-milling process may be performed at a milling speed of 4,200 rpm, and a pump may have a rotational speed of 110 to 120 rpm during the milling process.

The wet-milling step preferably comprises wet-milling the slurry mixture to a particle size $D_{50}$ of 0.10 μm, and the slurry mixture may be milled to $D_{max} \leq 1.5$ μm. When an average particle diameter of solid particles in the slurry is too large, a final powder packing density tends to be lowered since reactivity is deteriorated in the calcination process, and sphericity of the solid particles is lowered.

A zirconium element may be contained in the slurry mixture in an amount of 0.01 to 0.10 mol %, the slurry mixture may preferably have a Li/Ti ratio of 0.81. When the zirconium element is contained in the slurry mixture in an amount of more than 0.10 mol %, capacity is lowered, and resistance is increased. Therefore, when the zirconium element is contained in the slurry mixture in an amount of less than 0.01 mol %, growth of the primary particles is increased, and deterioration of rate properties is caused.

Gases supplied during the spray drying process may include air, nitrogen and others, and may preferably include air. It is preferable to use pressurized gases obtained after pressurizing the gases. The spray dried mixture may have a particle size $D_{50}$ of 7 to 20 μm, and a tap density of 0.68 to 0.79 g/cm$^2$.

A sprayer used during spray drying may be a rotary disc type sprayer or a nozzle type sprayer, and the nozzle type sprayer may be a pressure nozzle type sprayer or a two-fluid nozzle type sprayer. In addition, the sprayer may include all of means well known in the art such as a rotary sprayer, a pressure nozzle, a pneumatic nozzle, a sonic nozzle, and the like.

In the calcination step, although calcination conditions also depend on a raw material composition, the primary particles are excessively grown if a calcination temperature is too high while a volume density is small, and specific surface area is excessively increased if the calcination temperature is too low. Therefore, an atmosphere during the calcination process in the calcination step may be an oxygen-containing gas atmosphere such as air or the like, or an inert gas atmosphere such as nitrogen, argon or the like, the calcination temperature may be a temperature of 700 to 800° C., and a calcination time may be 10 to 20 hours.

The preparation method of the present invention may further comprise the step of classifying the calcined mixture using a sieve having a sieve size corresponding to 200 to 400 meshes or the step of finely milling the calcined mixture to obtain a finely milled mixture.

In the fine milling step, the calcined mixture may be finely milled using a classifier having a rotational speed of 5,000 to 7,000 rpm at an air pressure of 6.0 to 6.5 bar.

The finely milled mixture may have a particle size $D_{50}$ of 0.5 to 2.0 μm.

An intensity of Rutile-TiO$_2$ compared to a main peak of a lithium-titanium complex oxide of the present invention is about 2%, and an intensity of Anatase-TiO$_2$ compared to the main peak of the lithium-titanium complex oxide of the present invention is about 1%.

Hereinafter, the present invention will be described in more detail through Examples. These Examples are only for illustrating the present invention, and it is apparent to those skilled in the art that the scope of the present invention is not to be construed as limited to these Examples.

Example 1. Wet-Milling

TiO$_2$ (COSMO Chemical Co., Ltd, purity≥98%), Li$_2$CO$_3$ (SQM, purity≥95%), and Zr(OH)$_4$ (NAOH, purity≥40%) were mixed by designing a Li/Me ratio as 0.81. After mixing the materials, a wet-milling process was performed under conditions including a bead size of 0.30 mm, a milling speed of 4,200 rpm, a rotational speed of a pump of 110 to 120 rpm for 7 hours by using a wet mill. The wet-milling process was performed under conditions (particle sizes and chemical compositions) of the following Table 1 to obtain wet-milled slurry mixtures.

TABLE 1

|  | Unit | Example 1-1 | Example 1-2 | Example 1-3 | Example 1-4 | Example 1-5 |
|---|---|---|---|---|---|---|
| Particle size Distribution (slurry) | $D_{min}$ μm | 0.147 | 0.040 | 0.040 | 0.040 | 0.040 |
|  | $D_{10}$ | 0.287 | 0.101 | 0.089 | 0.078 | 0.057 |
|  | $D_{50}$ | 0.536 | 0.394 | 0.304 | 0.219 | 0.104 |
|  | $D_{90}$ | 1.006 | 0.900 | 0.795 | 0.640 | 0.229 |
|  | $D_{max}$ | 1.622 | 1.660 | 1.445 | 1.445 | 1.413 |
| Chemical composition | Li/Ti ratio | 0.81 | 0.81 | 0.81 | 0.81 | 0.81 |
|  | Zr % | 0.01 | 0.01 | 0.01 | 0.01 | 0.01 |

Comparative Example 1

The wet-milling process was performed in the same manner as in Example 1 except that the bead size was 0.65 mm.

Example 2. Calcination Step

Spray dried slurries were obtained by performing spray drying process on the wet-milled slurry mixtures obtained in Example 1 through a spray dryer under conditions of an inlet temperature of 250° C. and an outlet temperature of 110° C. After performing the spray drying process, calcined products were obtained by performing a calcination process on the spray dried slurries under conditions including a calcination temperature of 700 to 800° C. and a calcination time of 10 to 20 hours by using a firing furnace such as a box furnace or a RHK (Roller Hearth Kiln).

Measurement Example 1. Photographing of SEM Images

After photographing SEM images for particles having particle sizes of slurries that had been wet-milled in Example 1, the photographed SEM images for the particles are illustrated in FIG. 1, and after photographing SEM images for primary particles of active materials that had been calcined in Example 2, the photographed SEM images for the primary particles are illustrated in FIGS. 2A to 2E and FIGS. 3A to 3D.

Measurement Example 2

Figure 4:
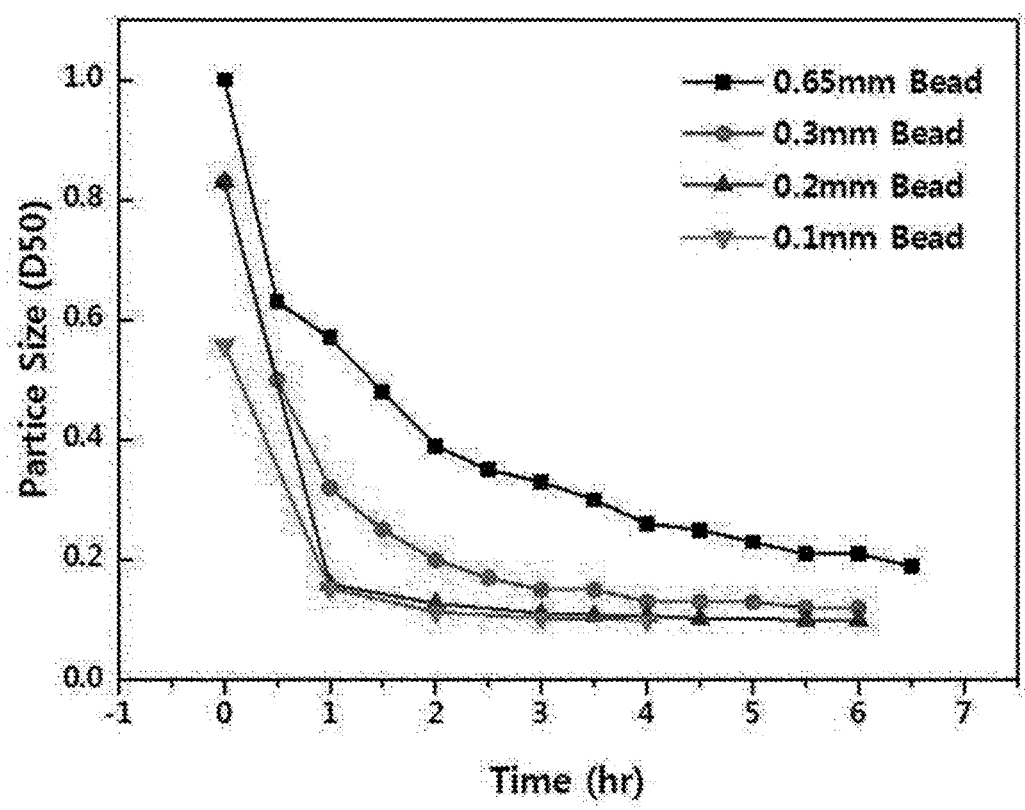
FIG. 4 illustrates results of observing arrival times of an average particle diameter $D_{50}$ at which is intended to be arrived according to bead sizes in the wet-milling step of the present invention.
Figure 5:
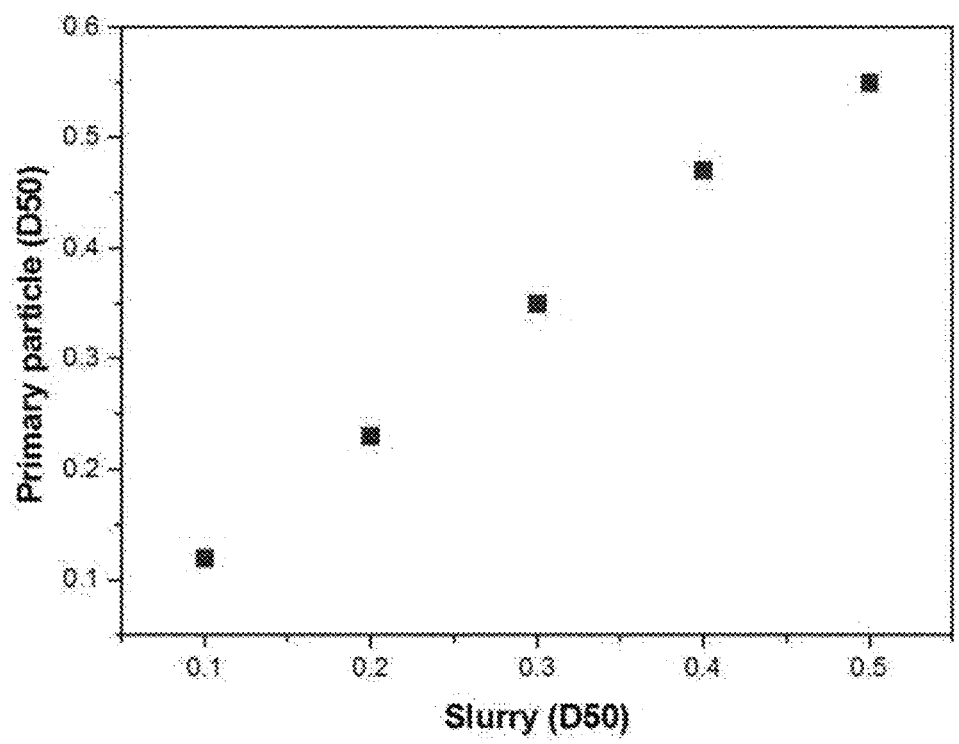
FIG. 5 illustrates a relationship between slurry particles and primary particles of active materials of the present invention.
Figure 6A:
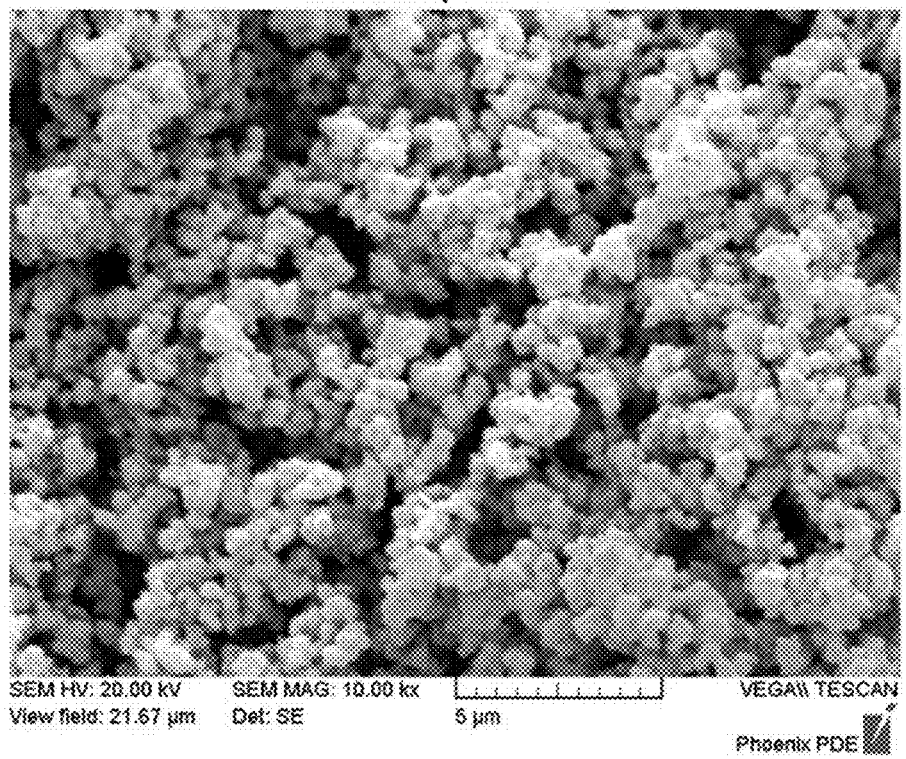
FIGS. 6A to 6E illustrate expanded SEM images of lithium-titanium complex oxides after finely milling the calcined products according to the present invention.
Figure 6B:
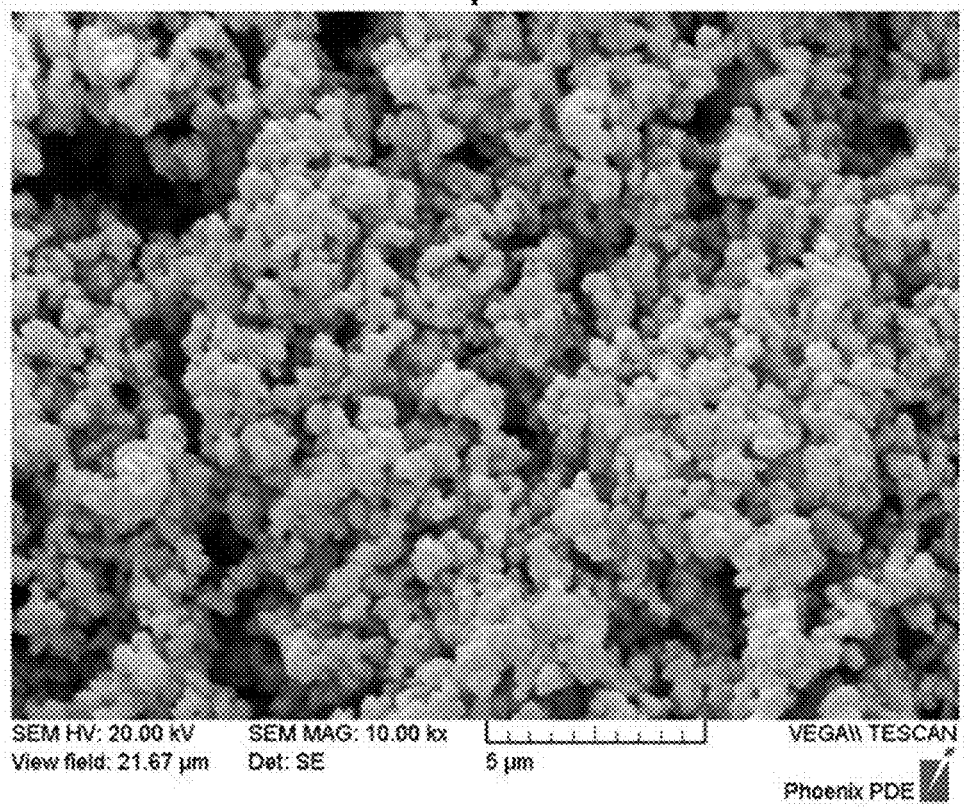
Figure 6C:
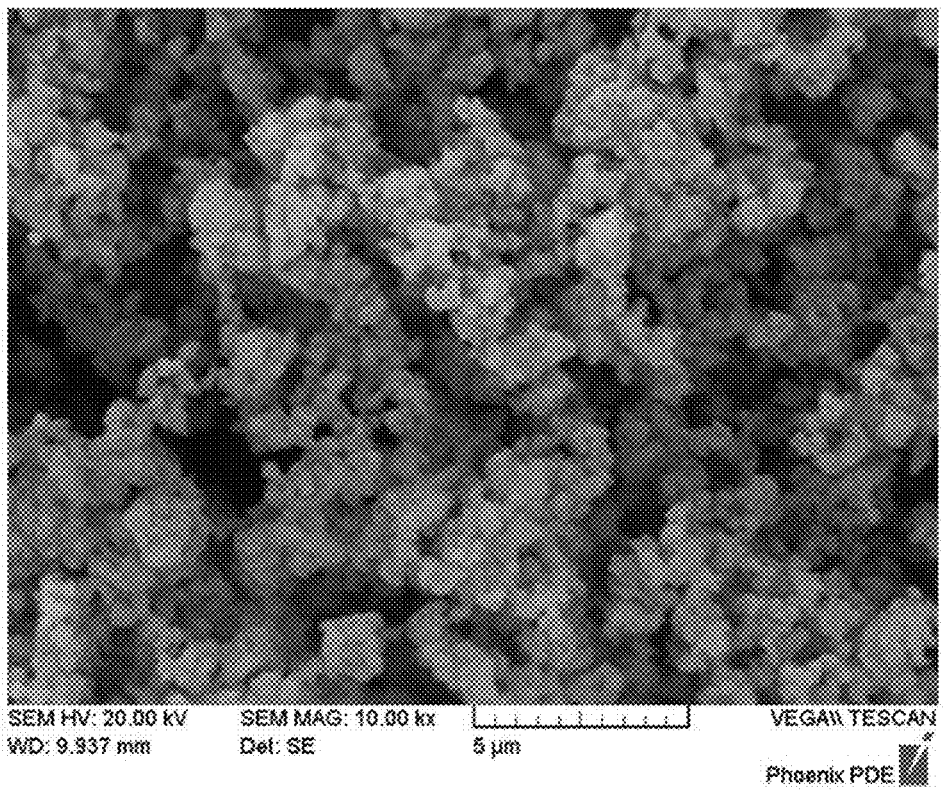
Figure 6D:
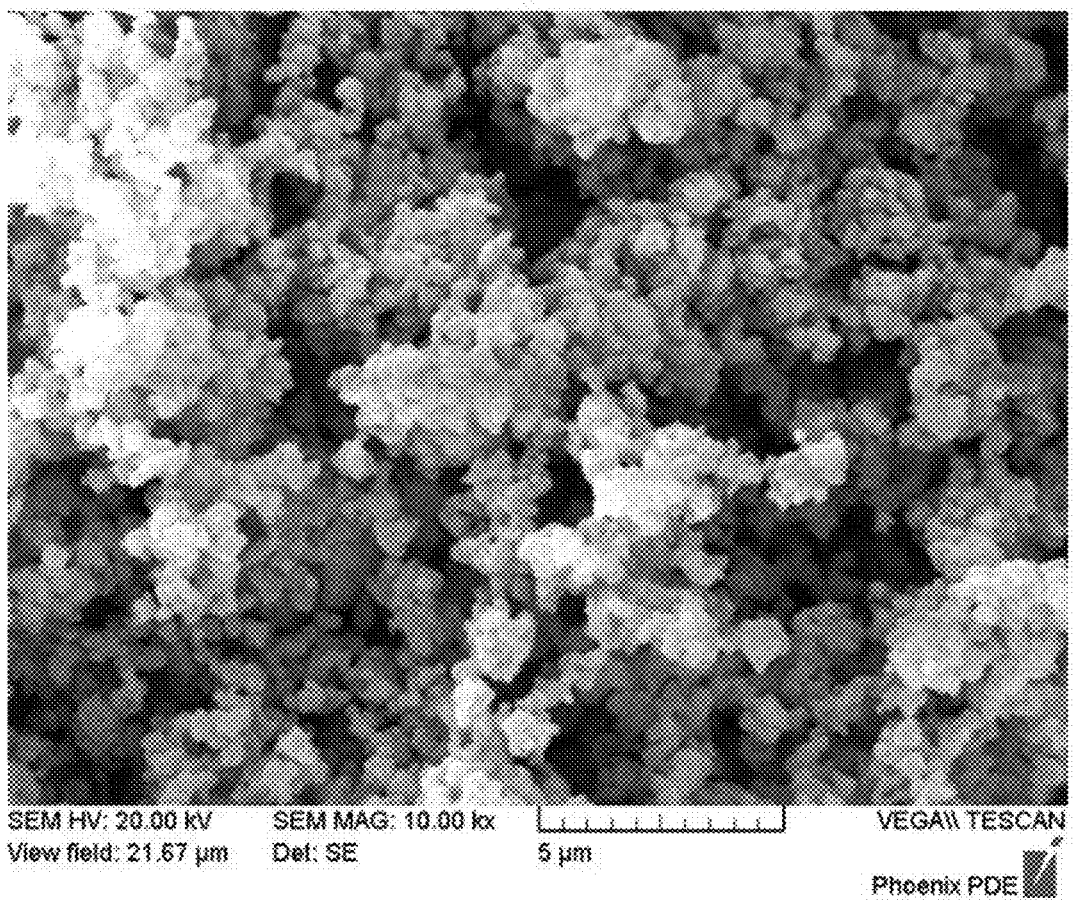
Figure 6E:
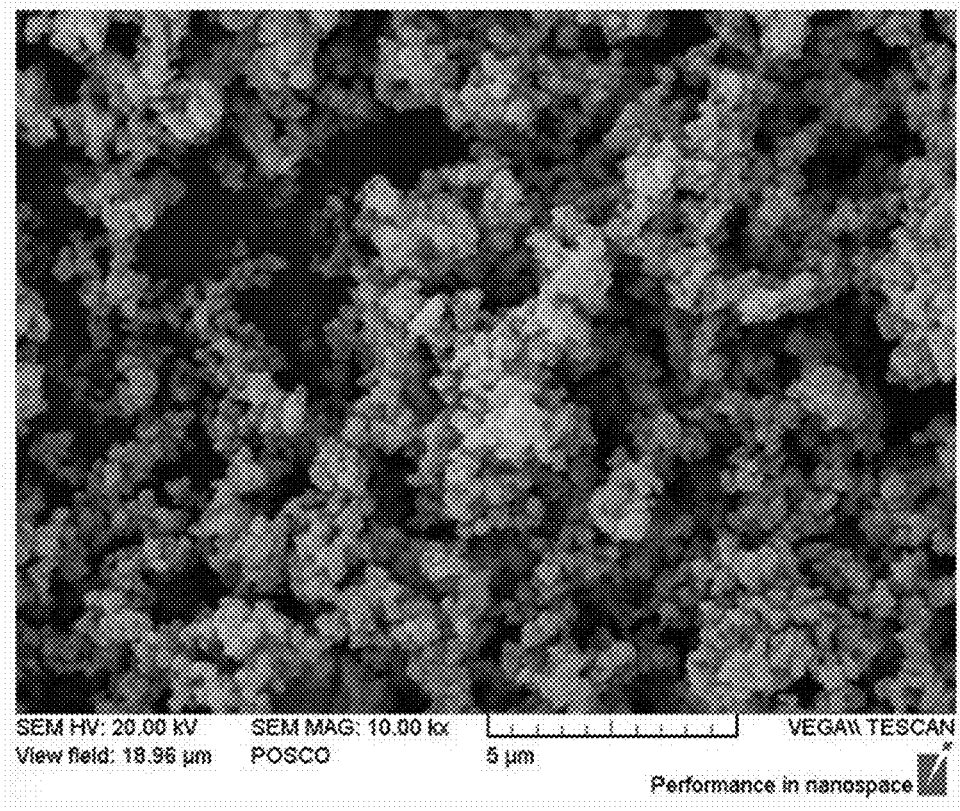

A graph of comparing average slurry particle diameters $D_{50}$ according to wet-milling time variations due to a difference between bead sizes in Example 1 and Comparative Example 1 is illustrated in FIG. 4, and a relationship between sizes of the average slurry particle diameters $D_{50}$ of Example 1 and primary particle sizes of the active materials calcined in Example 1 is shown in Table 2 and FIG. 5.

TABLE 2

|  | Example 1-1 | Example 1-2 | Example 1-3 | Example 1-4 | Example 1-5 |
|---|---|---|---|---|---|
| Slurry particle size ($D_{50}$) | 0.54 μm | 0.39 μm | 0.30 μm | 0.22 μm | 0.10 μm |
| Primary particle size | 0.55 μm | 0.47 μm | 0.35 μm | 0.23 μm | 0.12 μm |

Example 3-1. Large Particle Diameter Process ($D_{50}$: 1.2 to 20 μm)

After classifying calcined products obtained by performing the calcination process in Example 2 using a standard sieve having a sieve size corresponding to 200 to 400 meshes, lithium-titanium complex oxides were finally obtained.

Example 3-2. Small Particle Diameter Process ($D_{50}$: 0.5 to 2.0 μm)

After finely milling the calcined products obtained by performing the calcination process in Example 2 under conditions including an air pressure of 6.0 to 6.5 bar and a classifier's rotational speed of 5,000 to 7,000 rpm by using a jet air mill, lithium-titanium complex oxides were finally obtained.

Measurement Example 2

After measuring diameters of primary particles from enlarged images obtained by photographing finely milled lithium-titanium complex oxides according to Example 3-2 using a scanning electron microscope, measurement results are illustrated in FIGS. 6A to 6E.

Measurement Example 3. Changes in Characteristics According to Slurry Particle Sizes After measuring particle sizes, chemical compositions, impurity concentrations, tap densities, Brunauer-Emmett-Teller (BET) surface areas, pH values, electrochemical characteristics, and phase distributions of the spray dried slurries obtained by performing the spray drying process in Example 2, measurement results are shown in Table 3, and after measuring particle sizes, chemical compositions, impurity concentrations, tap densities, BET surface areas, pH values, electrochemical characteristics, and phase distributions of the finely milled slurries obtained by performing a fine milling process on the spray dried slurries, measurement results are shown in Table 4. The phase distributions were calculated using the following Expression 1 and Expression 2.

Rutile-$TiO_2$ intensity (%)=main peak intensity value of Rutile-$TiO_2$/main peak intensity value of lithium-titanium complex oxide    Expression 1:

Anatase-$TiO_2$ intensity (%)=main peak intensity value of Anatase-$TiO_2$/main peak intensity value of lithium-titanium complex oxide    Expression 2:

TABLE 3

| | | Unit | Example 1-1 | Example 1-2 | Example 1-3 | Example 1-4 | Example 1-5 |
|---|---|---|---|---|---|---|---|
| Particle size distribution | $D_{min}$ | μm | 3.90 | 3.90 | 3.90 | 2.60 | 2.60 |
| | $D_{10}$ | | 8.78 | 7.29 | 7.33 | 7.89 | 7.69 |
| | $D_{50}$ | | 13.70 | 13.16 | 13.23 | 14.15 | 13.85 |
| | $D_{90}$ | | 20.27 | 21.80 | 21.77 | 23.34 | 22.95 |
| | $D_{max}$ | | 39.23 | 39.23 | 34.26 | 51.47 | 51.47 |
| Impurities | Residual LiOH | ppm | 81 | 77 | 127 | 92 | 179 |
| | Residual $Li_2CO_3$ | | 1,923 | 1,850 | 1,557 | 2,131 | 2,106 |
| Tap density | | g/ml | 0.79 | 0.75 | 0.74 | 0.71 | 0.68 |
| BET surface area | | $m^2/g$ | 4.8 | 5.2 | 5.8 | 6.4 | 7.0 |
| pH | | — | 10.5 | 10.5 | 10.5 | 10.6 | 10.6 |
| Electrochemical test | 0.1 C Discharge | mAh/g | 168.7 | 169.1 | 169.5 | 170.3 | 170.9 |
| | 10 C/0.1 C | % | 78 | 83 | 86 | 89 | 92 |
| Phase | $A-TiO_2$ | % | 0.0 | 0.0 | 0.0 | 0.0 | 0.0 |
| | $R-TiO_2$ | | 1.6 | 1.5 | 1.4 | 1.2 | 1.2 |

TABLE 4

| | | Unit | Example 1-1 | Example 1-2 | Example 1-3 | Example 1-4 | Example 1-5 |
|---|---|---|---|---|---|---|---|
| Particle size distribution | $D_{min}$ | μm | 0.23 | 0.23 | 0.23 | 0.20 | 0.20 |
| | $D_{10}$ | | 0.64 | 0.62 | 0.56 | 0.53 | 0.54 |
| | $D_{50}$ | | 1.73 | 1.69 | 1.65 | 1.52 | 1.36 |
| | $D_{90}$ | | 4.41 | 4.36 | 4.57 | 4.13 | 3.32 |
| | $D_{max}$ | | 11.56 | 11.56 | 13.24 | 11.56 | 10.10 |
| Impurities | Residual LiOH | ppm | 145 | 195 | 227 | 228 | 279 |
| | Residual $Li_2CO_3$ | | 2,528 | 2,783 | 2,707 | 2,899 | 2,396 |
| Tap density | | g/ml | 0.68 | 0.63 | 0.59 | 0.52 | 0.45 |
| BET surface area | | $m^2/g$ | 5.5 | 5.9 | 6.3 | 6.9 | 7.4 |
| pH | | — | 10.5 | 10.5 | 10.5 | 10.6 | 10.6 |
| Electrochemical test | 0.1 C Discharge | mAh/g | 168.7 | 169.9 | 170.1 | 170.4 | 171.1 |
| | 10 C/0.1 C | % | 82 | 85 | 87 | 90 | 94 |
| Phase | $A-TiO_2$ | % | 0.0 | 0.0 | 0.0 | 0.0 | 0.0 |
| | $R-TiO_2$ | | 1.6 | 1.5 | 1.4 | 1.2 | 1.2 |

Hereinabove, preferred embodiments of the present invention have been described in detail. However, the scope of the right of the present invention is not limited thereto. The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

According to the present invention, there is an effect that the particle sizes can be adjusted through the milling process by controlling particle sizes of the precursor slurry through wet-milling.

Further, there is an effect of improving tap density, specific surface area and electrochemical characteristics of the lithium-titanium complex oxide that is finally prepared.

The preparation method according to the present invention has an effect that the particle sizes can be adjusted through the milling process by controlling particle sizes of the precursor slurry through wet-milling.

Further, the preparation method according to the present invention has an effect of improving tap density, specific surface area and electrochemical characteristics of the lithium-titanium complex oxide that is finally prepared.

What is claimed is:

1. A preparation method of a lithium-titanium complex oxide, the preparation method comprising the steps of:
    preparing a slurry mixture in which a titanium oxide, lithium, and zirconium are mixed;
    wet-milling the slurry mixture for 2 to 7 hours using beads having a size of 0.10 to 0.30 mm to obtain a wet-milled mixture such that a particle size ($D_{50}$) of the slurry mixture is controlled to be 0.22 μm or less;
    spray drying the wet-milled mixture to obtain a spray dried mixture; and calcining the spray dried mixture.

2. The preparation method of claim 1, wherein the wet-milling process is performed at a milling speed of 4,200 rpm.

3. The preparation method of claim 1, wherein the wet-milling step comprises wet-milling the slurry mixture such that the particle size ($D_{50}$) is 0.10 μm.

4. The preparation method of claim 1, wherein the slurry mixture has a Li/Ti ratio of 0.81.

5. The preparation method of claim 1, wherein the slurry mixture has a zirconium element contained therein in an amount of 0.01 to 0.10 mol %.

6. The preparation method of claim 1, wherein the spray dried mixture has a particle size ($D_{50}$) of 7 to 20 μm.

7. The preparation method of claim 1, wherein the calcination step comprises performing a calcination process at a temperature of 700 to 800° C. in an inert gas atmosphere for 10 to 20 hours.

8. The preparation method of claim 1, further comprising the step of classifying the calcined mixture using a sieve having a sieve size corresponding to 200 to 400 meshes.

9. The preparation method of claim 1, further comprising the step of finely milling the calcined mixture to obtain a finely milled mixture.

10. The preparation method of claim 9, wherein the finely milled mixture has a particle size ($D_{50}$) of 0.5 to 2.0 μm.

11. A lithium-titanium complex oxide prepared by preparation method of claim 1, in which Rutile-$TiO_2$ is contained in an amount of about 1.2 to 1.6%, and Anatase-$TiO_2$ is contained in an amount of 0%.

* * * * *